(12) United States Patent
Ignash

(10) Patent No.: US 6,321,501 B1
(45) Date of Patent: Nov. 27, 2001

(54) COLLAPSIBLE THREE SIDED TRUSS

(76) Inventor: James P. Ignash, 287 Norlynn, Howell, MI (US) 48843

( * ) Notice: Subject to any disclaimer, the term of this patent is extended or adjusted under 35 U.S.C. 154(b) by 0 days.

(21) Appl. No.: 09/550,358

(22) Filed: Apr. 19, 2000

Related U.S. Application Data

(60) Provisional application No. 60/130,004, filed on Apr. 19, 1999.

(51) Int. Cl.[7] .................................................... E04H 12/00
(52) U.S. Cl. ............................. 52/645; 52/646; 52/650.1; 52/641
(58) Field of Search ............................. 52/633, 637, 638, 52/650.1, 650.2, 650.3, 646, 655.1, 653.1, 653.2, 645, 648.1, 690–695, 641

(56) References Cited

U.S. PATENT DOCUMENTS

| | | | |
|---|---|---|---|
| 3,371,458 | * | 3/1968 | Sturgill ..................................... 52/646 |
| 4,620,405 | * | 11/1986 | Melland ..................................... 52/645 |
| 4,829,739 | * | 5/1989 | Coppa ..................................... 52/648 |
| 5,205,101 | * | 4/1993 | Swan ..................................... 52/650.1 |
| 5,390,463 | * | 2/1995 | Sollner ..................................... 52/726.2 |
| 5,822,945 | * | 10/1998 | Muller ..................................... 52/646 |
| 6,026,626 | * | 2/2000 | Fisher ..................................... 52/633 |
| 6,076,770 | * | 6/2000 | Nygren ..................................... 52/646 |
| 6,082,068 | * | 7/2000 | Fisher ..................................... 52/633 |

* cited by examiner

Primary Examiner—Beth A. Stephan
(74) Attorney, Agent, or Firm—John R. Benefiel

(57) ABSTRACT

A collapsible three sided truss, in which a rectangular central framework section has outboard framework sections each hinged to one side, which can be swung together to bring interfitting portions together, with locking mechanisms manually operable to connect these portions together and form a rigid three sided truss. When released and swung out, the outboard sections form a flattened array with the central section for easy transport and handling. Slidable pins are included in the locking mechanisms, engaging aligned holes in partial sleeves on cross members of one outboard section fit to elongated member of the other outboard section. The three sided trusses can be connected end-to-end with couplings and locking pins.

14 Claims, 4 Drawing Sheets

COLLAPSIBLE THREE SIDED TRUSS

CROSS REFERENCE TO RELATED APPLICATIONS

This application claims the benefit of U.S. provisional application Ser. No. 60/130,004, filed Apr. 19, 1999.

BACKGROUND OF THE INVENTION

This invention concerns trusses used to provide temporary support structures, such as used in exhibitions for supporting displays, lighting, etc., or in concerts or theaters for sound equipment, sets, etc.

Such temporary applications make ease in assembly and disassembly of the trusses important. Since the trusses are often transported to different sites, their bulkiness is a distinct disadvantage.

U.S. Pat. No. 6,026,626 describes such trusses which are nesting to be stackable, saving space. However, the one open side reduces stiffness, and the stacked trusses while taking up less room than closed trusses, the stackable trusses are still bulky.

U.S. Pat. No. 3,371,458 shows end to end attachments for three sided trusses which can be quickly installed.

U.S. Pat. No. 2,839,123 shows a boatswain's chair frame which can be disassembled by tedious removal of threaded fasteners.

However, such a truss which is quickly collapsible for storage has not heretofore been provided.

It is the object of the present invention to provide a truss of the type described which is quickly and readily collapsible for easy transport, can also be quickly reconfigured into to the truss structure. It is a further object to provide such trusses which can be quickly and easily assembled to each other in a stacked configuration.

SUMMARY OF THE INVENTION

The above recited object as well as others which will be understood upon a reading of the following specification and claims are achieved by a three sided truss, with a central framework section hingedly connected to the two outboard framework sections along a respective sides of the central section. The two outboard sections are adapted to be connected along one side to each other by a quick release connection to form a rigid three sided truss with the central section. The quick release connection comprises cupped, partial sleeve pieces attached to the end of each of a series of cross members forming a part of one of the outboard sections which can be swung together on collars fitted on a lengthwise elongated member of the central section. The partial sleeve pieces are received onto a lengthwise elongated member forming the free side of the other outboard section, when the other outboard section swung towards the one outboard section on sleeves fit on another lengthwise elongated member forming the other side of the central section.

The quick release connection includes a locking mechanism comprising spring loaded locking pins mounted in the ends of the cross members, which pins can be inserted into aligned holes extending through the partial sleeves and the mating elongated member. This locks the two outboard sections together to form a rigid, three sided truss.

The pins may be retracted and latched to enable quick disconnection to allow the outboard sections outwardly to collapse the truss.

The ends of the lengthwise elongated members have interfitting pin and socket parts, with a tethered pin insertable in aligned cross holes through the pin and socket for an end-to-end connection.

A "D" retainer clip retains the pin in its inserted position to prevent unintended withdrawal of the pin.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
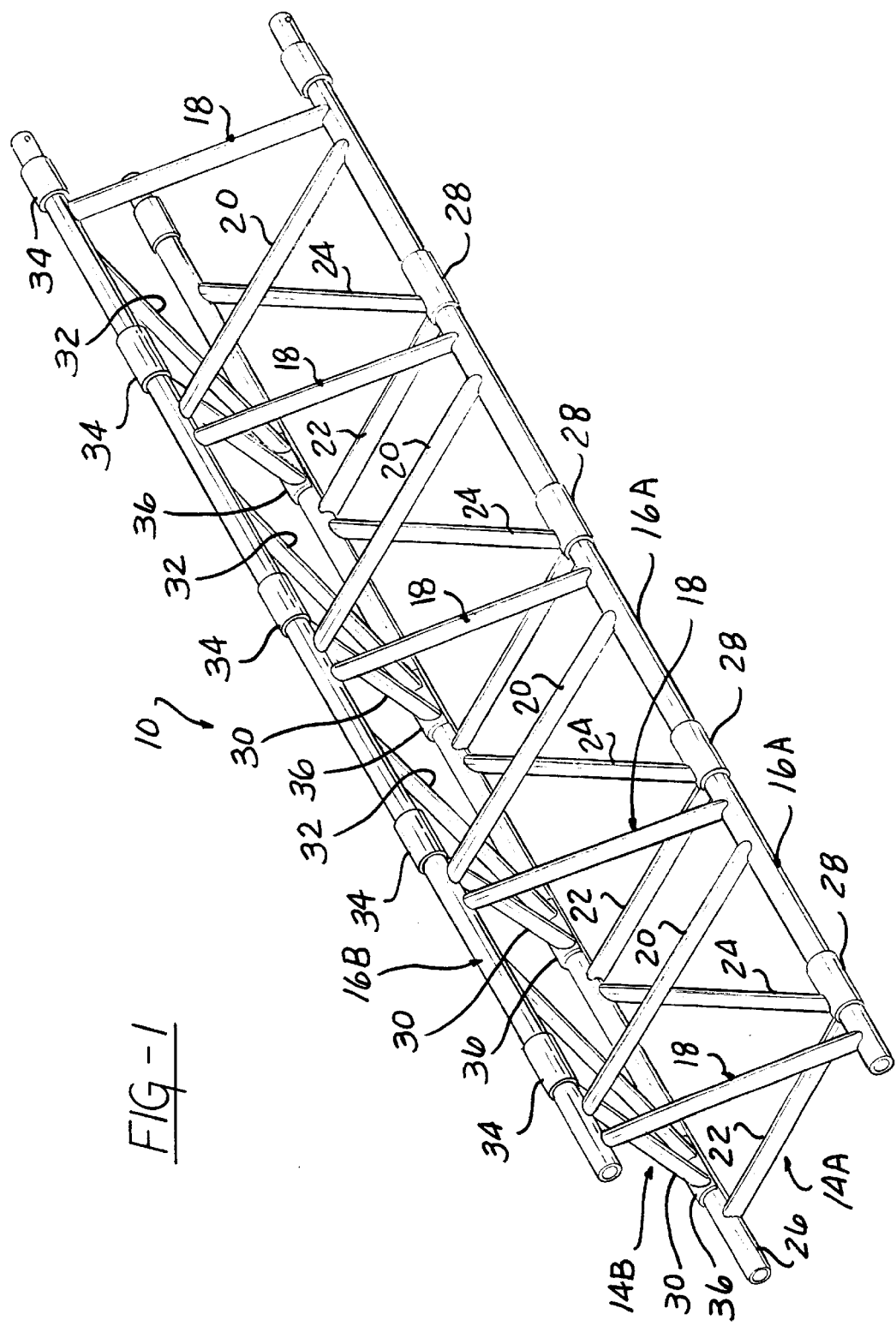
FIG. 1 is a perspective view of an erected three sectioned truss according to the present invention.
Figure 4:
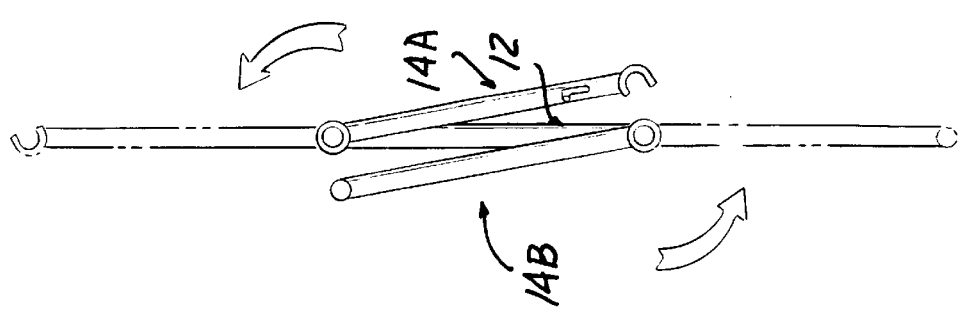
FIG. 4 is an endwise view showing the disconnected outboard sections folded into a collapsed storage transport condition.

FIG. 1 shows a truss 10 according to the invention, which is comprised of three generally planar and rectangular sections of an aluminum tubing framework, a central section 12, and two outboard sections 14A and 14B, secured together in a triangular configuration.

The central section 12 comprises a pair of parallel side by side elongated members 16A, 16B spaced apart and extending lengthwise, with cross members 18 and cross braces 20 extending therebetween, welded at opposite ends to a respective one of the elongated members 16A, 16B.

A first outboard section 14A has a series of cross members 22 and cross braces 24 welded at one end to a third elongated member 26 extending lengthwise along the section 14A. The other end of convergent pairs of cross member 22 and cross braces 24 are welded to a respective one of a series of sleeves 28 received over the elongated member 16A at spaced locations along the length thereof.

This creates a hinged connection of outboard section 14A with one side of the central section 12 allowing swinging movement thereof when it is released, as will be described.

The other cutboard section 14B comprises a series of cross members 30 and cross braces 32 welded at a divergent one end to a second series of sleeves 34 rotatable on the elongated member 16B of the central section 12 to create a hinged connection to the side opposite the side to which the other outboard section 14A is hinged.

The other convergent ends of pairs of the cross members 30 and cross braces 32 are welded to one of a series of partial, semicircular sleeves 36 sized to be fit over the outside diameter of the elongated member 26 of the other outboard section 14A.

Figure 5:
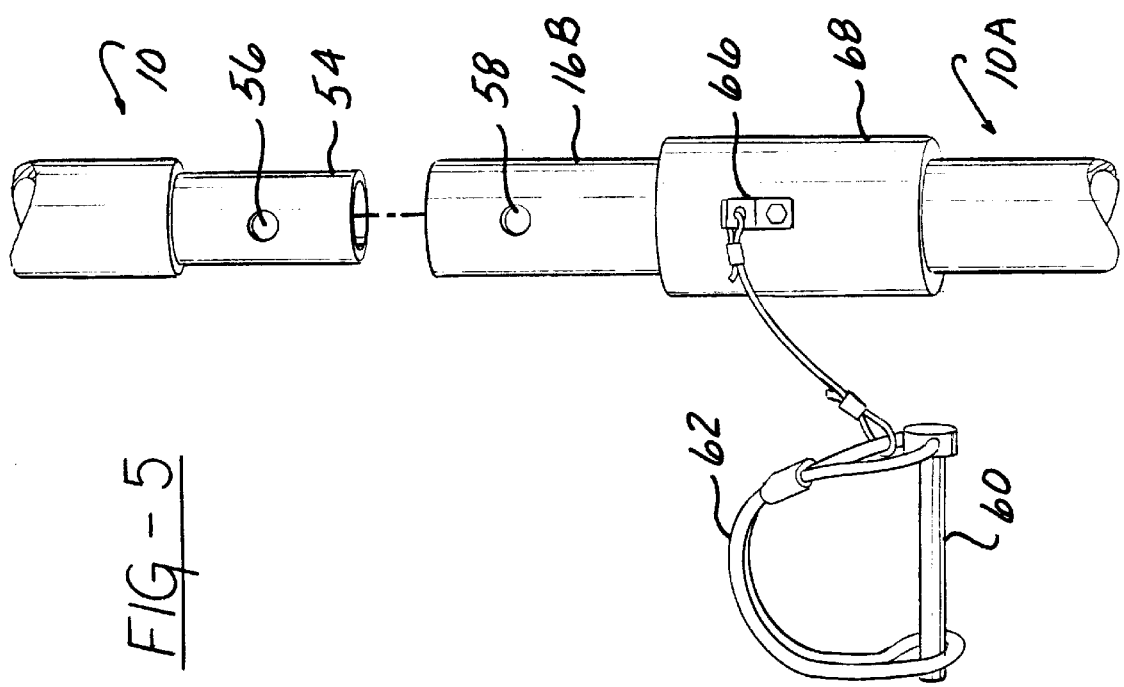
FIG. 5 is an enlarged fragmentary partially exploded view of the ends of adjacent erected trusses showing details of the connection components.
Figure 8:
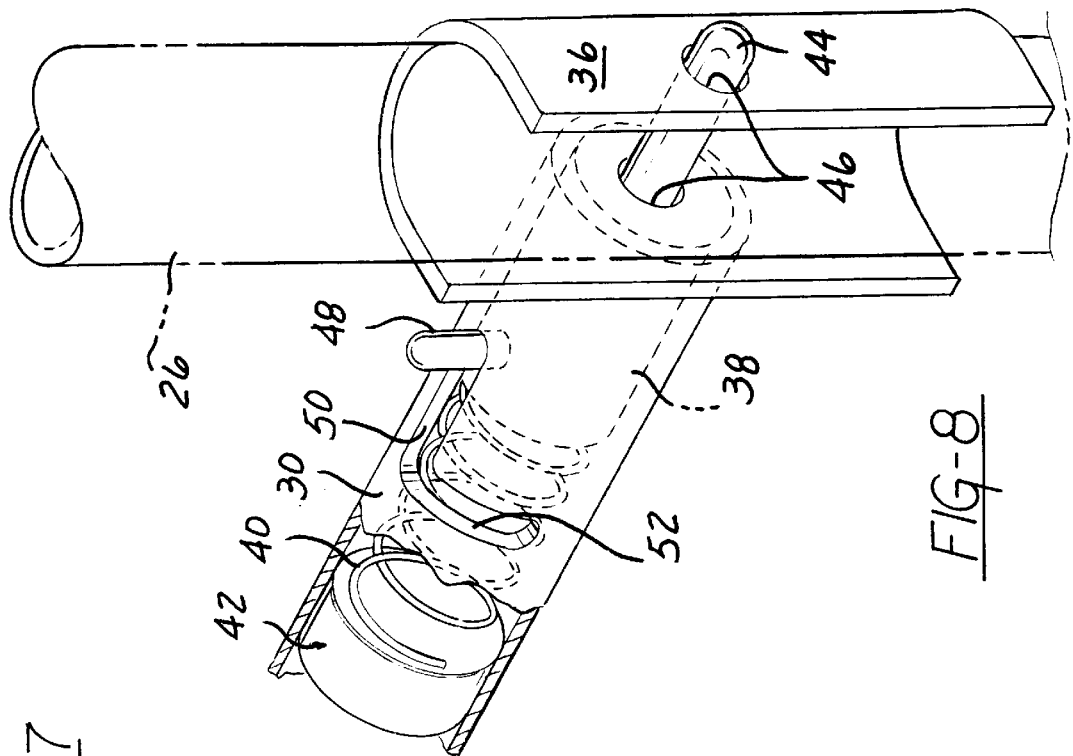
FIG. 8 is an enlarged, partially fragmentary perspective view of the one of the quick release connections between contiguous sides of the outboard sections, partially broken away to show details of the connection.

The partial sleeves 36 are locked thereto by a locking mechanism associated with each partial sleeve shown in FIG. 5, which includes a plunger 38 slidable in each cross member 30, urged outwardly by a spring 40 compressed by a stop plug 42.

The plunger 38 carries a locking pin 44 which is urged into aligned holes 46 on opposite sides of the partial sleeve 36.

The elongated member 26 is also formed with through holes aligned with the holes 46 such as to be locked to the partial sleeves 36.

A retraction bar 48 and slot 50 allows the locking pin 44 to be manually retracted against the force of the spring 40. A latching slot segment 52 allows the plunger 38 to be held in a retracted position.

Figure 3:
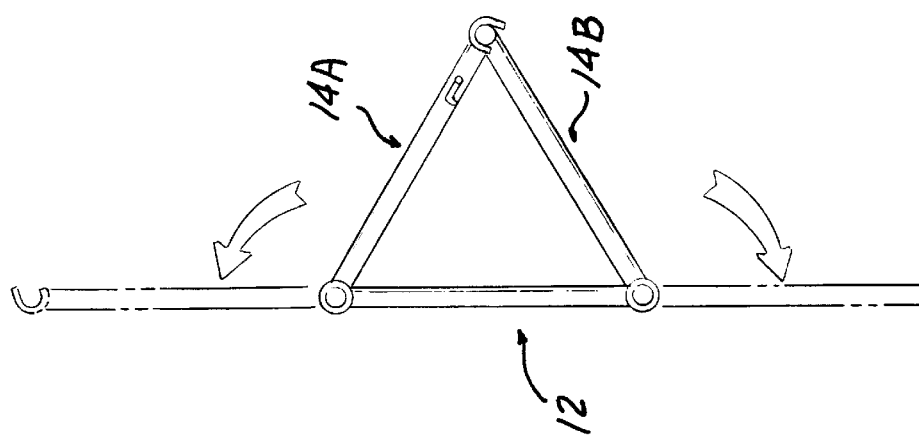
FIG. 3 is an endwise view of the truss in its erected condition, with the sections lying flat shown in phantom lines.
Figure 2:
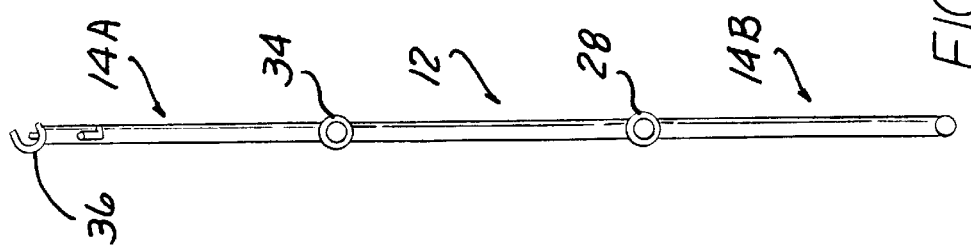
FIG. 2 is an endwise view of the truss shown in FIG. 1 with three sections lying flat after disconnection of contiguous sides of two of truss sections.

When the partial sleeves 36 are released each outboard section 14A, 14B can be swung away from the respective side of the central section 12 to which it had been attached as represented in FIG. 3, allowing the truss to flattened out as seen in FIG. 2.

The outboard sections 14A, 14B can be swung over the central section 12 to form a loose stacking of the sections 12, 14A, 14B for easier handling and storage.

The truss 10 can be easily restored at the site at which it is to be used.

Figure 6:
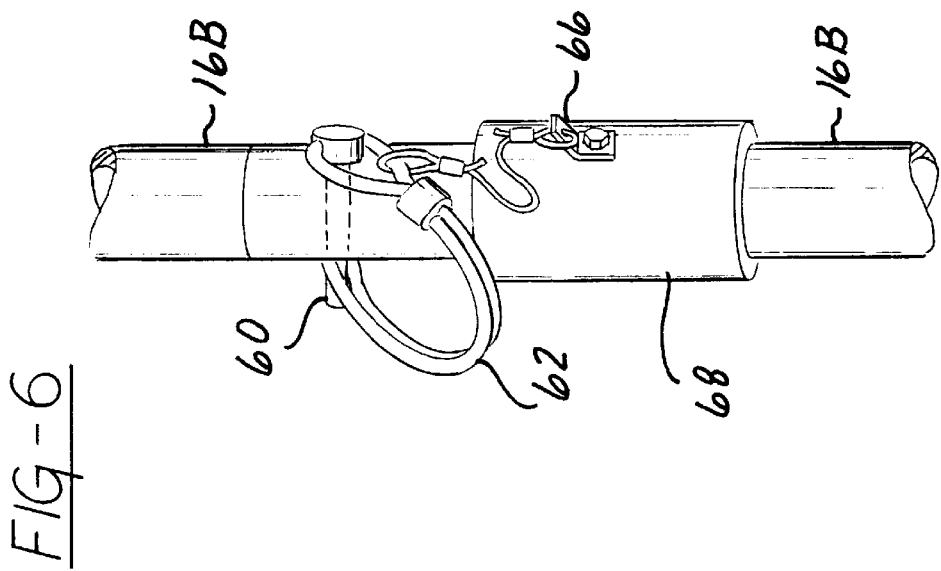
FIG. 6 shows the components of FIG. 5 in the fully assembled condition.

FIGS. 5 and 6 show the details of a locking arrangement for attaching adjacent trusses end to end to form a higher support.

Figure 7:
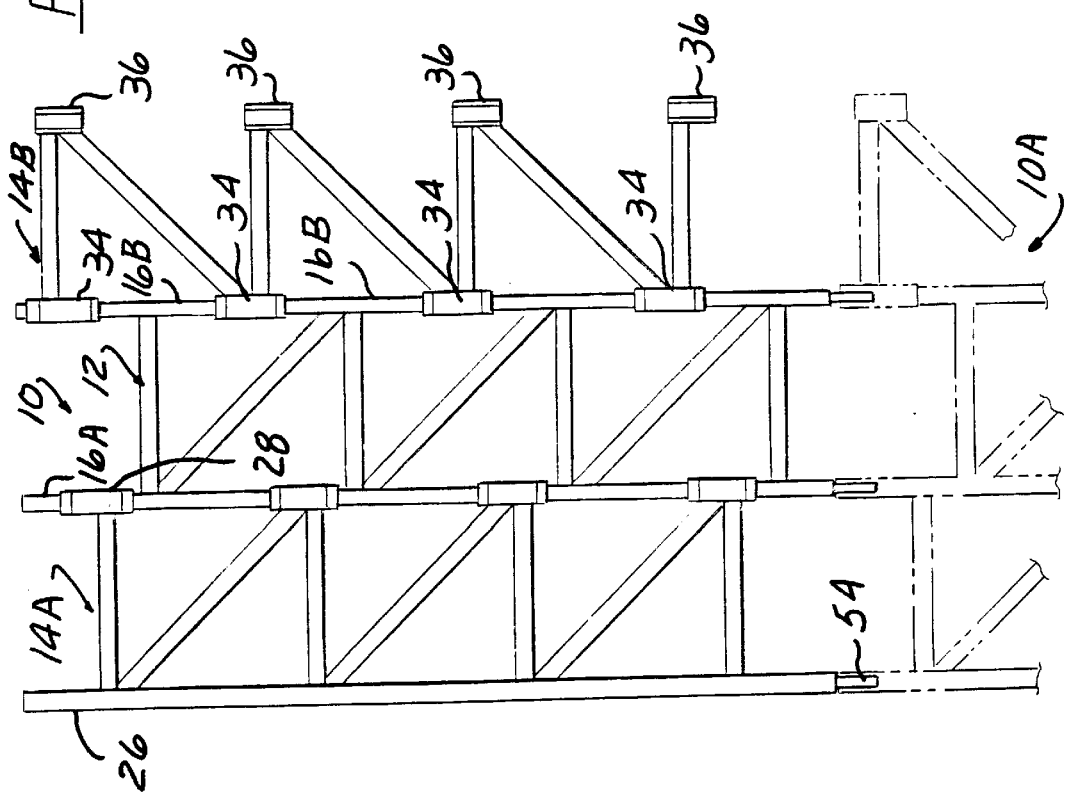
FIG. 7 is a plan view of a disconnected truss with the three sections lying flat.

This arrangement includes a reduced diameter end piece 54 extending from one end of each elongated member 16A, 16B, 26, sized to be slidably fit into the end of the corresponding members of another truss section 10A (shown in phantom lines FIG. 7). Aligned hole sets 56, 58 are drilled through the end piece 54 and the end of the elongated member 26, 16A and 16B.

A locking pin 60 is held in a wire retainer bail 62 tethered with a cable 64 to a bracket 66 screwed to a sleeve 68 on the elongated member 16B.

The locking pin 60 can have one end released by pulling the left side of the retainer bail 62 out, and allowing the pin 60 to be inserted in the aligned hole sets 56, 58 as seen in FIG. 6. The retainer bail 62 is reinstalled to keep the pin 60 from being withdrawn from the hole sets 56, 58.

It can be appreciated that the trusses according to the invention can be readily erected and collapsed within the use of tools or separate fasteners, and be easily transported and stored in their collapsed condition.

What is claimed is:

1. A collapsible three sided truss comprising:

a central section comprising a generally rectangular tubular framework including two side by side spaced apart parallel elongated members connected together by a series of members attached at either end to a respective one of said elongated members;

two outboard sections, each comprising a generally rectangular tubular framework hingedly connected to a respective side of said central section to be able to be swung towards each other so that said two outboard sections and said central section form a triangular in section truss, said outboard sections also able to be swung away from each other to form with said central section a generally flat array;

said outboard sections able to be connected to each other with a quick release connection, a series of portions on a side opposite said central section interfitting together when said outboard sections are swung together to form a triangular-in-section truss; and a series of locking mechanisms respectively associated with said series of interfitting portions selectively operable to connect said outboard sections together along contiguous sides thereof.

2. The collapsible truss according to claim 1 wherein said interfitting portions comprise a partial sleeve on each of a series of cross members of one of said outboard sections hingedly connected at one end to one of said elongated members of said central section and an elongated member of said other outboard section each partial sleeve fit onto the outside diameter of an elongated member of said other outboard section.

3. The collapsible truss according to claim 2 wherein said series of locking mechanisms each include a locking pin slidable in an associated cross member of said one outboard section and being receivable in aligned openings in said partial sleeve and an associated part of said elongated member of said other outboard section to lock the same together.

4. The collapsible truss according to claim 3 wherein a spring is included in each locking mechanism urging said locking pin into said aligned openings.

5. The collapsible truss according to claim 4 wherein each of said locking mechanisms include a retraction feature allowing manual retraction of said locking pin to withdraw said locking pin from said aligned openings.

6. The collapsible truss according to claim 5 wherein each of said locking mechanisms include a holding means allowing each of said locking pins to be held in a retracted position.

7. The collapsible truss according to claim 1 wherein each of said locking mechanisms include a movable locking pin engageable with interfitting portions associated therewith to lock the same together, said locking pin manually retractable to release said associated interfitting portions.

8. The collapsible truss according to claim 2 wherein said central section further includes cross braces extending angularly between said elongated members and fixed at each end to a respective elongated member of said central section.

9. The collapsible truss according to claim 8 wherein each of said outboard sections include a series of transverse cross members, and wherein said hinged connection between each of said outboard sections and a respective side of said central section includes a series of sleeves rotatable on each of said elongated members of said central section, cross members attached at one end to a respective one of a said series of sleeves.

10. The collapsible truss according to claim 9 wherein each of said outboard sections further include cross brace members extending angularly across said outboard sections said cross braces each fixed at one end to a respective sleeve in a respective series of sleeves.

11. The collapsible truss according to claim 2 further including coupling means on the ends of said elongated members allowing connecting a plurality of said trusses end-to-end together in a stacked series.

12. The collapsible truss according to claim 11 wherein said elongated members comprise tubes, and wherein said coupling means includes an end piece sized to be slidably received in an opposite end of a respective elongated member of a next adjacent truss, and a pin tethered to each elongated member insertable in aligned openings in said end piece and opposite end.

13. The collapsible truss according to claim 12 wherein each coupling means pin is held by a tethered spring clip engaging each end of said pin to act as a retainer after said pin is inserted in said aligned openings.

14. The collapsible truss according to claim 1 wherein each of said central and outboard sections is constructed of tubular members, including said elongated members.

* * * * *